United States Patent [19]
Nishizawa

[11] Patent Number: 5,831,348
[45] Date of Patent: Nov. 3, 1998

[54] SECONDARY CIRCUIT DEVICE FOR WIRELESS TRANSMIT-RECEIVE SYSTEM AND INDUCTION COIL FOR WIRELESS TRANSMIT-RECEIVE SYSTEM

[75] Inventor: Yuji Nishizawa, Tokyo, Japan

[73] Assignee: Mitsubishi Denki Kabushiki Kaisha, Tokyo, Japan

[21] Appl. No.: 755,347

[22] Filed: Nov. 22, 1996

[30] Foreign Application Priority Data

Jun. 3, 1996 [JP] Japan ................................. 8-140495

[51] Int. Cl.⁶ ............................................... H04M 11/04
[52] U.S. Cl. ................................. 307/104; 340/310.07
[58] Field of Search .............. 307/17, 104; 336/DIG. 2, 336/120; 340/310.07, 310.01; 439/950; 343/856, 788; 455/41

[56] References Cited

U.S. PATENT DOCUMENTS 4,473,817 9/1984 Perkins ................................. 340/310.07
5,055,775 10/1991 Scherz et al. ............................. 336/120
5,621,344 4/1997 Zierhut ................................. 340/310.07

FOREIGN PATENT DOCUMENTS

| 63-201887 | 8/1988 | Japan . |
| 4-278691 | 10/1992 | Japan . |
| 4-334975 | 11/1992 | Japan . |
| 5-59557 | 8/1993 | Japan . |
| 7-273701 | 10/1995 | Japan . |

*Primary Examiner*—Richard T. Elms
*Attorney, Agent, or Firm*—Sughrue, Mion, Zinn, Macpeak & Seas, PLLC

[57] ABSTRACT

In the secondary circuit device for wireless transmit-receive system according to the present invention, a first power resonance capacitor and a second power resonance capacitor are connected in parallel to a power induction coil, and also there is provided a resonance capacitor select switch which selectively closes either one of the first power resonance capacitor and the second power resonance capacitor according to the transmitting mode or receiving mode.

13 Claims, 22 Drawing Sheets

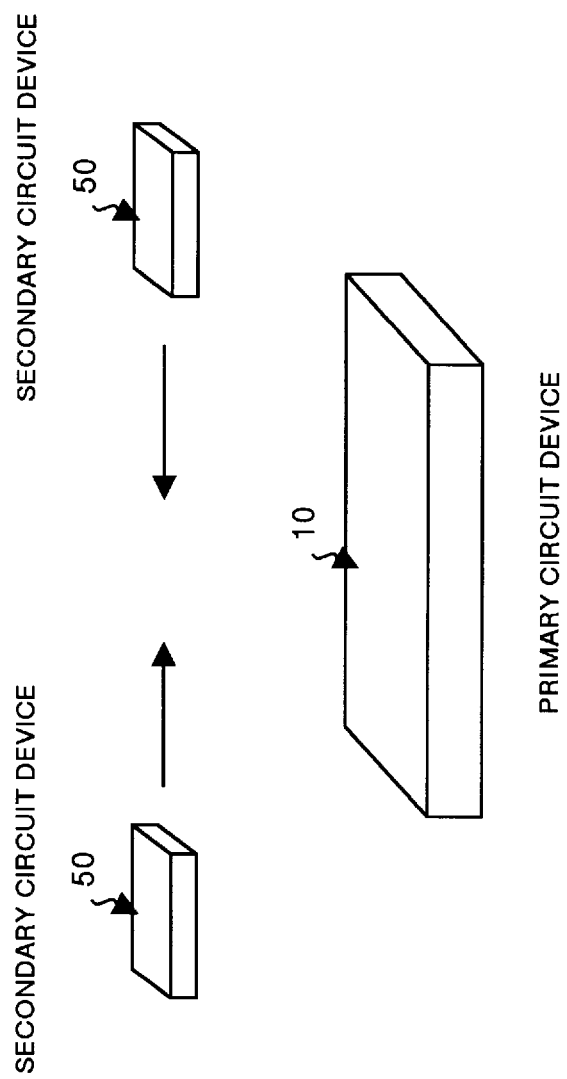

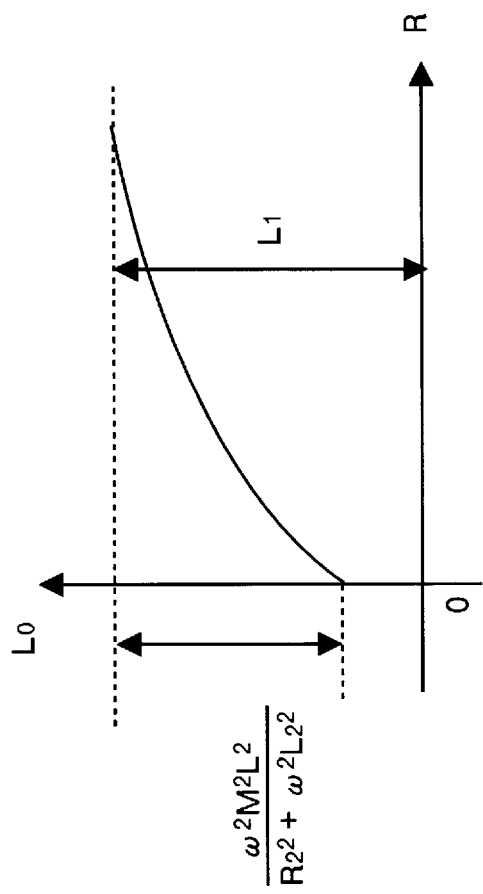

SECONDARY CIRCUIT DEVICE FOR WIRELESS TRANSMIT-RECEIVE SYSTEM AND INDUCTION COIL FOR WIRELESS TRANSMIT-RECEIVE SYSTEM

FIELD OF THE INVENTION

The present invention relates to a secondary circuit device and an induction coil for the wireless transmit-receive system, used in a wireless transmit-receive system with an IC card and more particularly to a secondary circuit device and an induction coil for the wireless transmit-receive system used in a wireless transmit-receive system for transmitting an electric power and a signal in a non-contact form according to mutual induction by using an induced electromotive force generated in a coil with a magnetic field.

BACKGROUND OF THE INVENTION

FIG. 13 shows an example of a wireless transmit-receive system for transmitting an electric power and a signal in a non-contact form based on the conventional technology. This wireless transmit-receive system comprises a primary circuit device 10, and a secondary circuit device 50. The primary circuit device 10 comprises a primary controller 11, a power amplifier 12, and primary coil 13.

The secondary circuit device 50 comprises a secondary power receiving coil (power induction coil) 51, a secondary power resonance capacitor 52, a rectifying circuit 53, a smoothing capacitor 54, and a secondary load 55 as power circuits, and also comprises a secondary signal coil (signal induced coil) 56, a signal transmit-receive select switch 57, a signal transmission series resonance capacitor 58, a signal receiving parallel resonance capacitor 59, and a secondary signal controller 60 as signal circuits.

The signal transmit-receive select switch 57 is switched to a contact point a for signal receiving end in a signal receiving mode according to a control signal outputted from the secondary signal controller 60, and to a contact point b for signal transmitting end in a signal transmitting mode. Namely, the signal transmit-receive select switch 57 selectively closes either one of the signal transmission series resonance capacitor 58 or a signal receiving parallel resonance capacitor 59 according to the transmitting mode or to the receiving mode.

Herein, $\omega_1$ indicates a power angular frequency, and $\omega_2$ indicates a signal angular frequency.

In the wireless transmit-receive system based on the conventional technology constructed as described above, there is a time division control system as a first example of a system in which an electric power and a signal are transmitted in a non-contact form according to mutual induction. The time division control system is a system, as shown in FIG. 14, in which radio interference between an electromagnetic wave of a signal and that of power is avoided by separating a time for signal transmit-receive from a time for power transmit-receive, so that reliability of the signal transmission can be improved. In this system, the power angular frequency $\omega_1$ and the signal angular frequency $\omega_2$ may be identical in this system.

As a second example of the system in which an electric power and a signal are transmitted in a non-contact form, there is a system in which a physical coupling factor between the secondary power receiving coil 51 and the secondary signal coil 56 is reduced, more specifically, a distance between the coils as shown in FIG. 15 is made wider, so that a power frequency $f_1$ and a signal frequency $f_2$ do not interfere with each other. In this case a smaller secondary signal coil 56 is provided inside a large loop-shaped secondary power receiving coil 51.

As described above, sizes of the two coils 51, 56 are differentiated from each other to reduce coupling factors of these two coils 51 and 56, and the secondary signal coil 56 is provided inside the secondary power receiving coil 51 because, as shown in FIG. 16, the secondary circuit device 50 having portability generally approaches from any direction to the fixed primary circuit device 10, but the secondary circuit device 50 to be operated, at first, receives the power and the power source has to be initiated to operate.

A third example of a system in which an electric power and a signal are transmitted in a non-contact form is a system in which the condition of (a power angular frequency $\omega_1$)<<(a signal angular frequency $\omega_2$) is set, in other words, the condition of (a power frequency $f_1$)<<(a signal frequency $f_2$) is set, and in this system, a power frequency element $f_1$ is removed with a frequency filter in the primary power transmitting circuit and a receiving section of a secondary signal transmitting/receiving circuit.

Conventionally, as a secondary power receiving coil 51 and a secondary signal coil 56, as shown in FIG. 17A and FIG. 17B, there has been used a coil system formed manually or mechanically winding a wire 100 such as a magnetic wire or the like, or a pattern coil (sheet coil) system, as shown in FIG. 18A and FIG. 18B, in which a conductor loop pattern 102 is patterned at the same position in each layer of a multi-layered printed board 101.

In the first example based on the conventional technology according to the time division control system, radio interference between an electromagnetic wave of a signal and that of power is avoided by separating a time for signal transmit-receive from a time for power transmit-receive, but if this system is employed, a time required for transmitting/receiving a signal and that for transmitting/receiving a power are made shorter, so that a transmitting speed of a signal is reduced and a power of an electric power transmission is also reduced.

In the second example based on the conventional technology, in order to reduce a physical coupling factor between the secondary power receiving coil 51 and the secondary signal coil 56, a distance between the coils is made larger, so that a size of the secondary circuit device 50 becomes disadvantageously larger.

In the third example based on the conventional technology, to achieve the condition of (a power frequency $f_1$)<<(a signal frequency $f_2$), the power frequency $f_1$ can not be made higher, which makes it impossible to efficiently transmit an electric power.

Description is made for the fact described above with reference to an equivalent circuit in the secondary circuit side viewed from the output side of the electric power circuit shown in FIG. 19. In FIG. 19, $L_1$ indicates an electric power induction coil, $R_1$ indicates a series resistance of the electric power induction coil $L_1$, $L_2$ indicates a signal induction coil, and the signal induction coil $L_2$ is coupled to the electric power induction coil $L_1$ with a mutual inductance M. $R_2$ indicates a series resistance of the signal induction coil $L_2$, and R indicates an equivalent resistance excluding the coil section of the signal circuit.

Herein, assuming that impedance $Z_0$ viewed from the output side of the electric power circuit is set to $Z_0 = R_0 + j\omega L_0$, this expression is expressed by the following expression (1).

$$Z_0 = \frac{(R_1 + j\omega L_1)(R_2 + R + j\omega L_2) + \omega^2 M^2}{R_2 + R + j\omega L_2} \quad (1)$$

$$\therefore R_0 = R_1 + \frac{\omega^2 M^2 (R_2 + R)}{(R_2 + R)^2 + \omega^2 L_2^2}, \quad (2)$$

$$L_0 = L_1 - \frac{\omega^2 M^2 L_2}{(R_2 + R)^2 + \omega^2 L_2^2}$$

Now, a resistance value of the series resistance $R_2$ of the signal induction coil $L_2$ is very small, and $\omega L_2$ is larger than $R_2$ ($\omega L_2 > R_2$), so that the resistance $R_0$ in the expression (2) is expressed by a maximum value $Rm = R_1 + \omega M^2/2\, L_2$ when $R = \omega L_2 - R_2$.

The following expression is satisfied with the expression (2).

$$R_0|_{R-0} = R_1 + \frac{\omega^2 M^2 R_2}{R_2^2 + \omega^2 L_2^2}, \quad R_0|_{R-\infty} = R_1 \quad (3)$$

Accordingly, a relation between an equivalent resistance R and $R_0$ is expressed as shown in FIG. 20.

As for an inductance $L_0$, $(\delta^2 L_0/\delta R_2) > 0$ is obtained from the expression (2), so that an inductance $L_0$ increases simply in association with increase of the equivalent resistance R, and value thereof becomes maximum when R is infinite. Namely, the following expression is obtained, $$L_0|_{R-0} = L_1 + \frac{\omega^2 M^2 L_2}{R_2^2 + \omega^2 L_2^2}, \quad L_0|_{R-\infty} = L_1 \quad (4)$$

so that a relation between the equivalent resistance R and Inductance $L_0$ is as shown in FIG. 21.

Herein, assuming that the relation is of an angular frequency $\omega_1$ of an power<<an angular frequency $\omega_2$ of a signal, impedance $1/\omega_1 C_3$ and $1/\omega_1 C_4$ according to an angular frequency $\omega_1$ of an power for a signal transmission series resonance capacitor 58 and a signal receiving parallel resonance capacitor 59 become larger respectively.

It should be noted that the reference numerals $C_3$, $C_4$ indicate capacitances of the signal transmission series resonance capacitor 58 and the signal receiving parallel resonance capacitor 59.

Namely, the equivalent series resistance R in the equivalent circuit shown in FIG. 19 becomes $1/\omega_1 C_3$ or $1/\omega_1 C_4$ in the signal transmitting mode and signal receiving mode respectively, so that, if it is assumed that the equivalent resistance $L_1$ excluding the coil section of the signal circuit is a power induction coil, the equivalent resistance $L_2$ is a signal induction coil, the resistance R, namely $1/\omega_1 C_3$ or $1/\omega_1 C_4$ becomes larger. With this feature, the output side viewed from the coil in the signal circuit is a similar to the open state, and the influence by the signal circuit viewed from the electric power circuit becomes smaller.

In other words, an electric power is not much absorbed by the signal circuit, and an effect of the signal circuit viewed from the electric power circuit decreases (but an effect of the electric power circuit viewed from the signal circuit remains).

However, the higher a power frequency is, the more a number of charging times to the smoothing capacitor 54 increases, so that an energy transfer efficiency becomes better, and for this reason, it is desired that power frequency is high from the view point of an energy transfer efficiency.

However, it is required to satisfy the condition of an angular frequency $\omega_1$ of a power<<an angular frequency $\omega_2$ of a signal, so that the signal frequency has to be set higher in association with use of a power frequency signal with a higher frequency.

Generally, in the wireless transmit-receive system, a frequency used in a low-cost electromagnetic induction system is in a range from around 100 kHz to 1 MHz, and the frequency described above is desirable also from the view point of designing a low-cost coil.

Accordingly, if the signal frequency is set, for instance, to 400 kHz, at most around 100 kHz can be allocated to the power frequency because it is required to satisfy the condition of an angular frequency $\omega_1$ of a power<<an angular frequency $\omega_2$ of a signal, so that an energy transfer efficiency does not increase so much.

Use of an ISM band of 13.56 MHz for power transmission is advantageous from the Wireless Law, and in that case a large quantity of power can be transmitted, but to satisfy the condition of an angular frequency $\omega_1$ of a power<<an angular frequency $\omega_2$ of a signal, the signal frequency has to be further increased, which is difficult from the view of designing a low-cost circuit and coil.

Also, there is a problem that an impedance viewed from the power circuit varies according to the transmit-receive mode for a signal circuit, and the energy transfer efficiency of a power varies thereby.

FIG. 22A and FIG. 22B each show an equivalent circuit of an LC parallel resonance circuit in the power circuit based on consideration to the equivalent series resistance Rc of the secondary power resonance capacitor.

Impedance $|Z|$ in this circuit is expressed by an expression (5).

$$|Z| = \sqrt{\frac{R^2 + \frac{1}{\omega^2 C^2}}{\left(1 - \frac{1}{\omega^2 LC}\right)^2 + \frac{R^2}{\omega^2 L^2}}} \quad (5)$$

Herein, when the inductance L of the power induction coil is expressed by an expression (6), $|Z|$ becomes $|Z|$ max, so that the resonance condition is satisfied. Impedance $|Z|$ max in this case is expressed by an expression (7).

$$L = \frac{1 + \omega^2 C^2 R^2}{\omega^2 C^2} \quad (6)$$

$$|Z|_{max} = \frac{1 + \omega^2 C^2 R^2}{\omega^2 C^2 R} \quad (7)$$

Now, the equivalent series resistance Rc is very small, so that $|Z|$ max becomes a very large value.

On the other hand, impedance $|Z|$ S in a right side viewed from the rectifying circuit 53 is very small because a capacity of the smoothing capacitor is large.

The impedance matching is required to most efficiently derive an electric power from the LC parallel resonance circuit to the rectifying circuit 53, and generally, as shown in FIG. 22B, a matching capacitor 101 is inserted thereto. Assuming that a capacitance C of the matching capacitor 101 is set to a very small value, the $1/\omega C$ becomes a large value, so that the impedance can be matched.

However, the impedance varies according to the transmit-receive mode of the signal circuit as described above, so that a capacitor for impedance matching is required to be varied according to the transmit-receive mode of the signal circuit.

If the coils 51, 56 are ones formed by manually or mechanically winding a magnetic wire or the like, many processes are required for winding it with the wire, so that the cost becomes expensive. Also if the coils 51, 56 are formed by winding at random, as the coils are closed to an input/output terminal to which a high voltage is applied, a floating capacity in this portion becomes larger, and also magnet wires are closed to each other, so that a line capacity becomes larger, and a self-resonance frequency of a coil becomes lower, which makes it impossible to use the coils at high frequency. In the coils formed by winding at random as described above, only a frequency of up to at most around 200 kHz can be used.

If the coils 51, 56 each comprise pattern coils formed by patterning at the same position in each layer of a multi-layered printed board, a distance between the patterns are small, so that a floating capacity becomes larger, and a self-resonance frequency of the coil becomes lower, which also makes it impossible to use it at high frequency.

SUMMARY OF THE INVENTION

It is an object of the present invention to obtain a secondary circuit device for a wireless transmit-receive system in which an electric power and a signal can efficiently be transmitted and an induction coil for a wireless transmit-receive system having a high frequency property.

In the secondary circuit device for a wireless transmit-receive system according to the present invention, a resonance capacitor select switch selectively closes either one of a first power resonance capacitor and a second power resonance capacitor according to the transmitting mode or receiving mode. With this feature, variation of the impedance viewed from the power circuit according to the transmit-receive mode in the signal circuit is compensated with a capacity of the capacitor.

In the secondary circuit device for a wireless transmit-receive system according to the present invention, a capacity of the variable capacity capacitor varies under control by the control means according to the transmitting mode or receiving mode. With this feature, variation of the impedance viewed from the power circuit according to the transmit-receive mode for the signal circuit is compensated with a capacitor capacity.

In the secondary circuit device for a wireless transmit-receive system according to the present invention, an inductance select switch selectively closes either one of an edge section or an intermediate tap of a power induction coil with a tap according to the transmitting mode or receiving mode. With this feature, variation of the impedance viewed from the power circuit according to the transmit-receive mode for the signal circuit is compensated with inductance of the power induction coil with a tap.

In the secondary circuit device for a wireless transmit-receive system according to the present invention, a high impedance element makes the equivalent resistance in the transmitting mode smaller, so that a power for the power circuit is not consumed by the impedance in a secondary signal controller.

In the secondary circuit device for a wireless transmit-receive system according to the present invention, a high impedance element can effectively be realized with a power impedance coil.

In the secondary circuit device for a wireless transmit-receive system according to the present invention, the impedance matching select switch selectively closes either one of a first impedance matching capacitor and a second impedance matching capacitor according to the transmitting mode or receiving mode. With this feature, impedance can be matched with that of a rectifying circuit even if a parallel resonance impedance during resonance varies in association with variation of a coil value in the power circuit according to the transmit-receive mode for the signal circuit.

In the secondary circuit device for a wireless transmit-receive system according to the present invention, power induction coils are provided in both sides of a signal induction coil respectively. With provision of the coils, a condition in which an electric power is required to start up first in the secondary circuit device is satisfied.

In the secondary circuit device for a wireless transmit-receive system according to the present invention, power induction coils are provided in both sides of a signal induction coil respectively. With this provision of the coils, a condition in which an electric power is required to start up first in the secondary circuit device is satisfied. In addition, each of the two power induction coils constitutes a parallel resonance circuit respectively, and a rectifying circuit is connected to each of the coils respectively, so that even if only one of the power induction coil is operated, the imbalance does not occur.

In the secondary circuit device for a wireless transmit-receive system according to the present invention, a signal induction coil and a power induction coil comprise conductor loop patterns each formed on a printed board respectively.

In the induction coil for a wireless transmit-receive system according to the present invention, one induction coil is formed by electrically connecting the conductor loop patterns on adjoining layers from the first layer up to the n-th layer, and a conductor loop pattern formed in each of the layers of a multi-layered printed board is displaced by a specified gap from that formed on the adjoining layer. With this feature, coils can be designed so that a gap between lines can be made wider and the input terminal and output terminal having the largest voltage difference therebetween can be provided away from each other.

In the induction coil for a wireless transmit-receive system according to the present invention, one induction coil is formed by electrically connecting the conductor loop patterns on adjoining layers from the first layer up to the n-th layer, and electrically connecting the conductor loop patterns on adjoining layers from the n-th layer up to the first layer, and a conductor loop pattern formed in each of the layers of a multi-layered printed board is displaced by a specified gap from that formed on the adjoining layer. With this feature, coils can be designed so that a gap between lines can be made wider and the input terminal and output terminal having the largest voltage difference can be provided away from each other, and also a number of patterns can be increased.

In the induction coil for a wireless transmit-receive system according to the present invention, the printed boards are overlaid with an insulating plate therebetween, and a terminating edge of a conductor loop pattern on one printed board is electrically connected, with a connecting fitting engaged and attached to the insulating plate, to a starting edge of a conductor loop pattern formed on another printed board adjoining the former layer with the insulating plate therebetween, so that one induction coil can be formed.

Other objects and features of this invention will become understood from the following description with reference to the accompanying drawings.

BRIEF DESCRIPTION OF THE DRAWINGS

FIG. 16 is an explanatory view showing an example of using the wireless transmit-receive system;

FIG. 21 is a graph showing a relation between equivalent resistance and impedance in the secondary circuit device;

DESCRIPTION OF THE PREFERRED EMBODIMENTS

Figure 1:
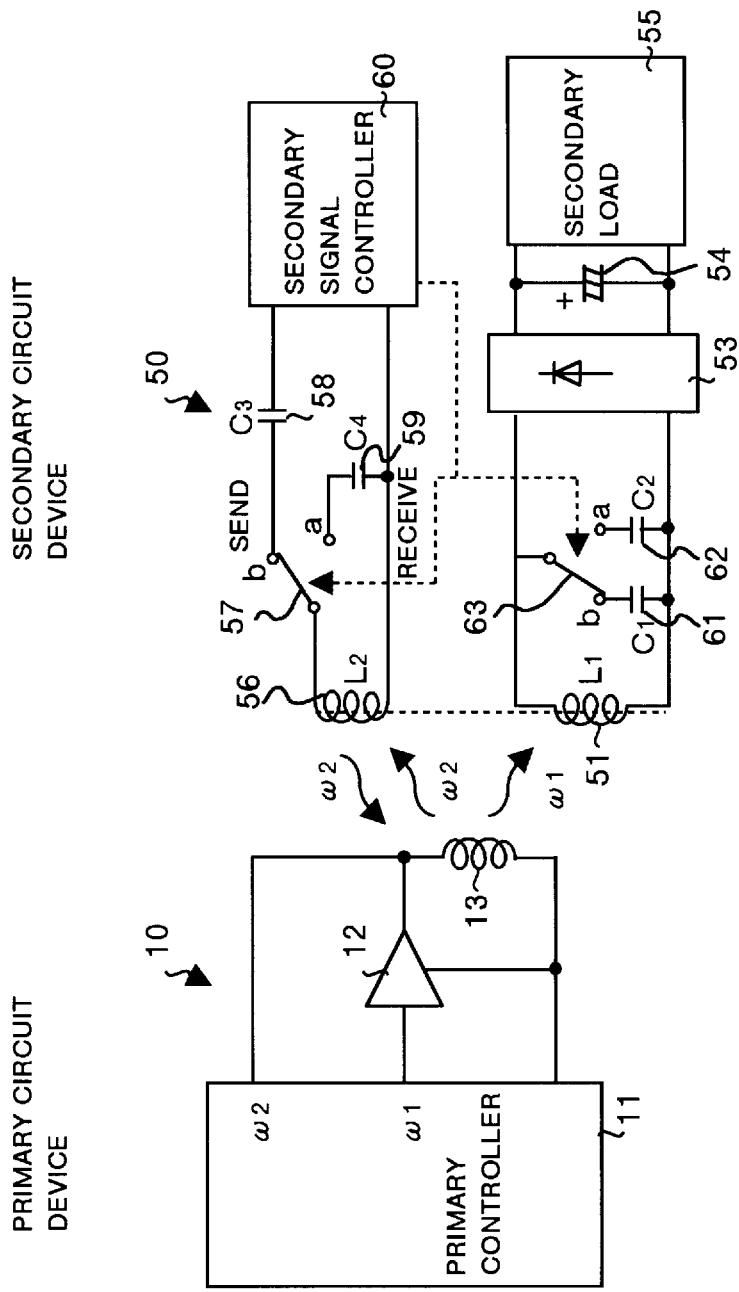
FIG. 1 is a circuit diagram showing Embodiment 1 of a wireless transmit-receive system including therein the secondary circuit device according to the present invention.

Detailed description is made hereinafter for embodiments of the present invention with reference to the attached drawings. It should be noted that, in the embodiments of the present invention described below, the same reference numerals are assigned to the same portions corresponding to those in the examples based on the conventional technology described above, and description thereof is omitted.

FIG. 1 shows Embodiment 1 of the wireless transmit-receive system including therein the secondary circuit device according to the present invention. The secondary circuit device 50 comprises two units of capacitors 61, 62 in which each of the capacitance is set respectively for receiving a maximum power as a secondary power resonance capacitor according to the transmit-receive mode for the signal circuit, and either one of the capacitors 61 and 62 is used by selecting it with a resonance capacitor select switch 63.

The resonance capacitor select switch 63 selects a contact point a for signal receiving in the signal receiving mode, and selects a contact point b for signal transmission in the signal transmitting mode according to a control signal outputted from a secondary signal controller 60 like in a case of a signal transmit-receive select switch 57.

Namely, the resonance capacitor select switch 63 selectively closes either one of the capacitors 61 and 62 according to the transmitting mode and receiving mode.

Description is made for operations of the circuit.

The secondary signal circuit makes parallel resonance or series resonance according to the receiving mode or signal transmitting mode, so that an angular frequency $\omega_2$ for a signal in the transmit-receive mode for the secondary signal circuit is expressed by expressions (8) and (9).

In receiving:

$$\omega_2 = \sqrt{\frac{1}{L_2 C_4}} \tag{8}$$

In transmitting:

$$\omega_2 = \sqrt{\frac{1}{L_2 C_3}} \tag{9}$$

Consequently, assuming that the condition of an angular frequency $\omega_1$ of a power>>an angular frequency $\omega_2$ of a signal is satisfied, $C_3$ is equal to $C_4$.

Apparent resistance R in a right side from the inductance $L_2$ in the signal circuit is expressed by expressions (10), (11) in the receiving mode and transmitting mode respectively.

In receiving:

$$R = \frac{1}{\omega_1 C_4} \tag{10}$$

In transmitting:

$$R = \frac{1}{\omega_1 C_3} + \text{(impedance in the secondary signal controller 15)} \tag{11}$$

Figure 19:
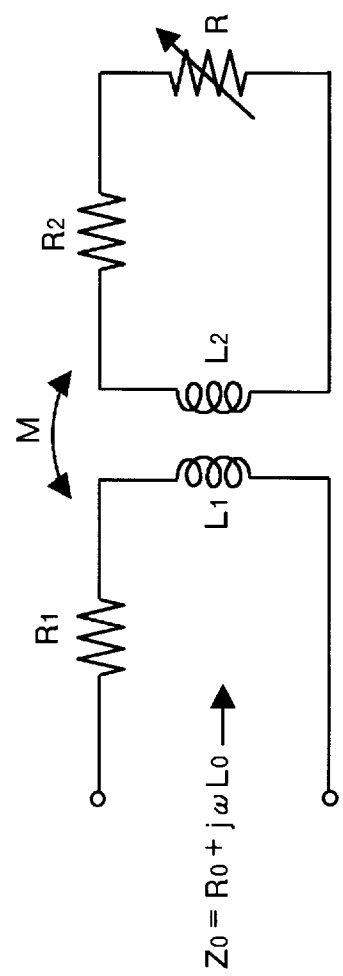
FIG. 19 is an equivalent circuit diagram of the secondary circuit device viewed from the output side of the electric power circuit.
Figure 20:
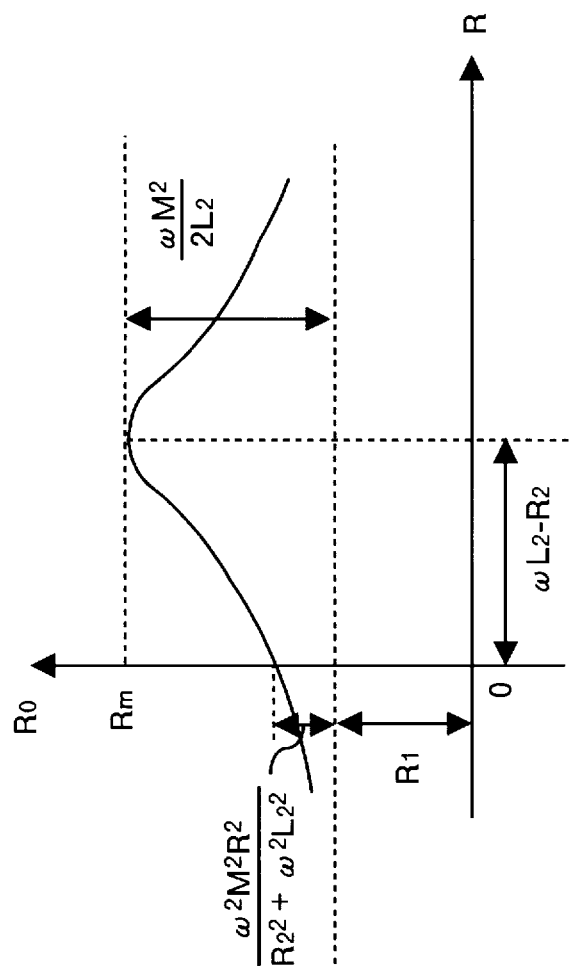
FIG. 20 is a graph showing an impedance property of the secondary circuit device.
Figure 22A:
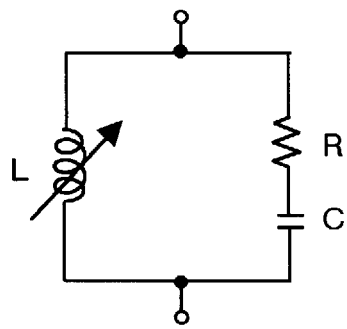
FIG. 22A is an equivalent circuit diagram of the LC parallel resonance circuit in the electric power circuit in consideration of equivalent series resistance in the secondary power resonance capacitor.
Figure 22B:
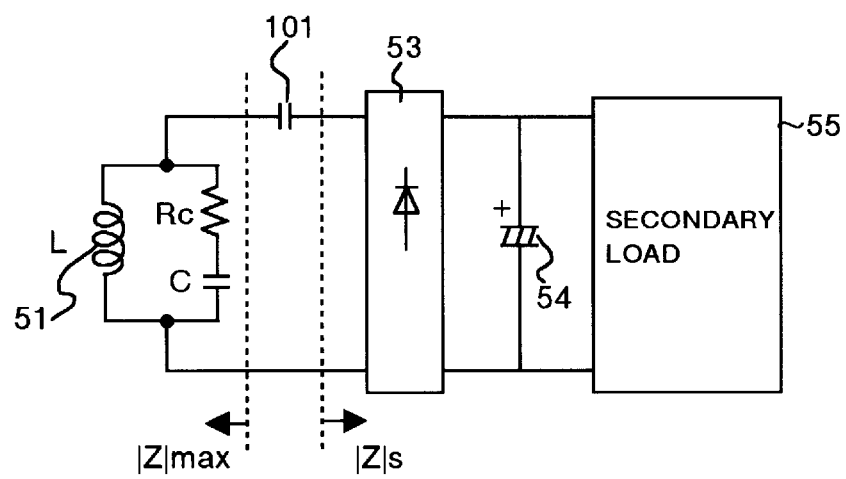
FIG. 22B is an entire circuit diagram for the same.

Consequently, equivalent resistance R in FIG. 19 varies according to the receiving mode or the transmitting mode, so that the inductance $L_0$ in the expression (2) also varies.

Accordingly, the electric power circuit $L_1$ in the circuit shown in FIG. 1 varies according to the receiving mode and transmitting mode, so that, to always satisfy the optimal resonance condition regardless of whether an operating state is in the receiving mode or in the transmitting mode, it is required to use either one of the capacitors 61 and 62 by selecting it with the resonance capacitor select switch 63 as shown in FIG. 1.

The resonance capacitor select switch 63 selects a contact point a for signal receiving in the signal receiving mode, and selects a contact point b for signal transmission in the signal transmitting mode according to a control signal outputted from the secondary signal controller 60 like in a case of the signal transmit-receive select switch 57, so that, even if the impedance viewed from the power circuit varies according to the transmit-receive mode for the signal circuit, the optimal resonance condition can always be obtained, an efficiency in energy transfer of a power does not vary, and a maximum power can be derived from the circuit with a specified power frequency.

In the embodiment, an angular frequency ω1 for a power transfer can be set to a higher value, and an ISM band in 13.56 MHz can be used, so that a large power allowable according to the specification can be transmitted.

Figure 2:
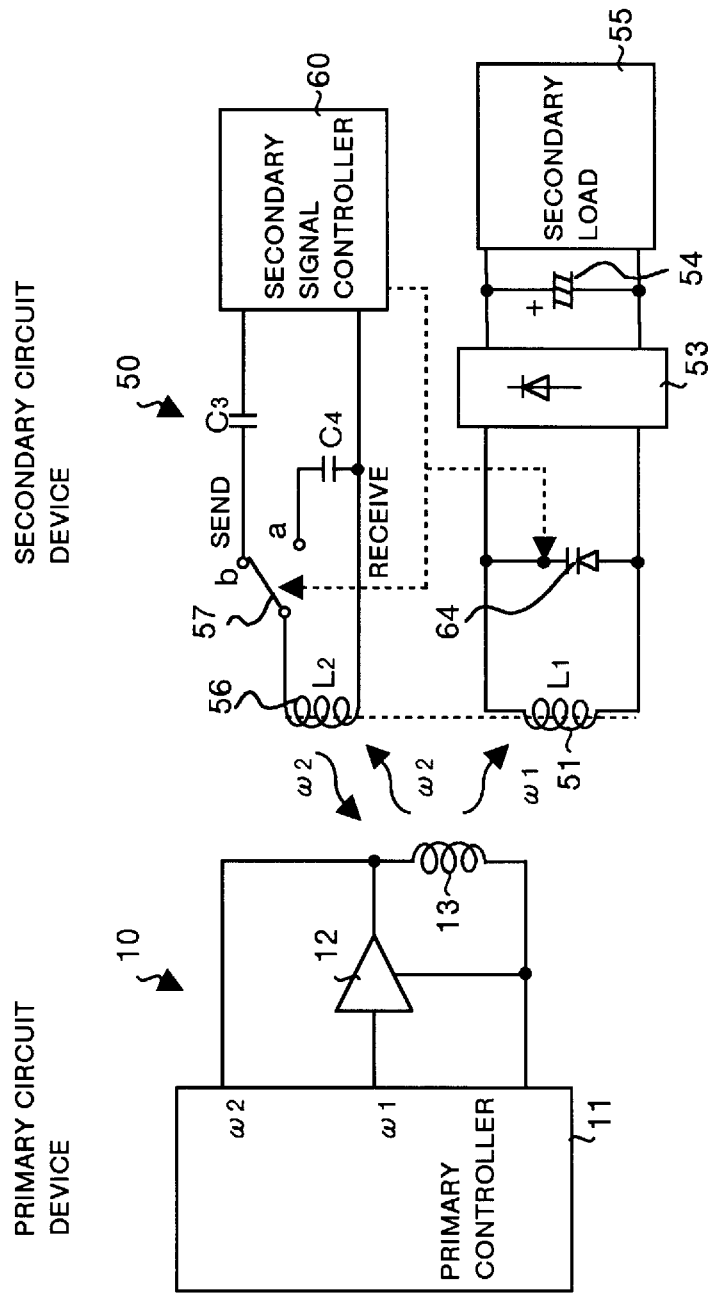
FIG. 2 is a circuit diagram showing Embodiment 2 of the wireless transmit-receive system including therein the secondary circuit device according to the present invention.

FIG. 2 shows Embodiment 2 of the wireless transmit-receive system including therein the secondary circuit device according to the present invention. In this embodiment, a variable capacity capacitor 64 based on a varactor or the like is used as a secondary power resonance capacitor in the secondary circuit device 50. The variable capacity capacitor 64 always receives a maximum power regardless of whether an operating state is in the transmitting mode or in the receiving mode for the signal circuit, so that a value of the capacity can be controlled with the secondary signal controller 60 according to the transmit-receive mode for the signal circuit.

As described above, by controlling a value of the capacity of the variable capacity capacitor 64 with the secondary signal controller 60, in this case also, even if the impedance viewed from the power circuit varies according to the transmitting or the receiving mode of the signal circuit, the optimal resonance condition can always be obtained, an efficiency in energy transfer of a power does not vary, and a maximum power can be derived from the circuit with a specified power frequency.

In the embodiment also, like in the case of Embodiment 1, an angular frequency $\omega_1$ for a power transfer can be set to a higher value, and an ISM band in 13.56 MHz can be used, so that a large power allowable according to the specification can be transmitted.

Figure 3:
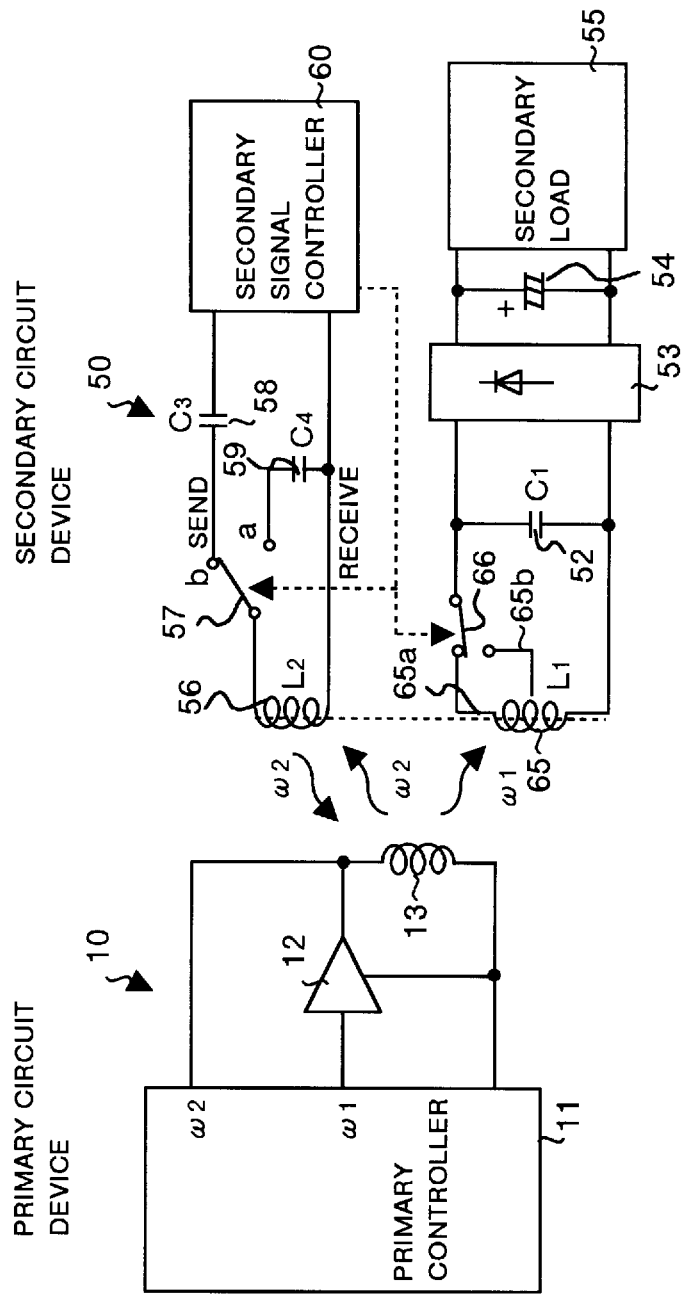
FIG. 3 is a circuit diagram showing Embodiment 3 of the wireless transmit-receive system including therein the secondary circuit device according to the present invention.

FIG. 3 shows Embodiment 3 of the wireless transmit-receive system including therein the secondary circuit device according to the present invention. In this embodiment, a power induction coil in the secondary circuit device 50 comprises a power induction coil 65 with a tap.

The power induction coil 65 with a tap is selectively connected to either one of a terminal section 65a and an intermediate tap 65b with an inductance select switch 66, the actual inductance $L_1$ varies.

The inductance select switch 66 is switched according to the transmitting mode or the receiving mode for the signal circuit, like in a case of the signal transmit-receive select switch 57, in response to a control signal outputted from the secondary signal controller 60.

Namely, the inductance select switch 66 selectively closes either one of the terminal edge 65a and the intermediate tap 65b of the power induction coil 65 with a tap according to the transmitting mode or the receiving mode.

The resonance condition of a power induction is expressed by the expression (12), so that, to obtain a specified angular frequency $\omega_1$, either one of capacitance $C_1$ and inductance $L_1$ during resonance circuit for a power may be adjusted. In the embodiment, the inductance is varied in place of varying capacitance during resonance circuit for a power.

Resonance condition in a power $$\omega_1 = \frac{1}{\sqrt{L_1 C_1}} \quad (12)$$

In the embodiment, the inductance select switch 66 is switched according to the signal receiving mode or the signal transmitting mode, like in a case of the signal transmit-receive select switch 57, in response to a control signal outputted from the secondary signal controller 60, so that either one of the terminal edge 65a and the intermediate tap 65b is connected to the circuit, and the actual inductance $L_1$ during resonance circuit for a power varies.

With this feature, even if the impedance viewed from the power circuit varies according to the transmit-receive mode for the signal circuit, the optimal resonance condition is always insured, an efficiency in power energy transfer is not varied, and a maximum power can be derived from the circuit with a specified power frequency.

In the embodiment also, like in the case of Embodiment 1, an angular frequency $\omega_1$ for a power transfer can be set to a higher value, and an ISM band in 13.56 MHz can be used, so that a large power allowable according to the specification can be transmitted.

Figure 4:
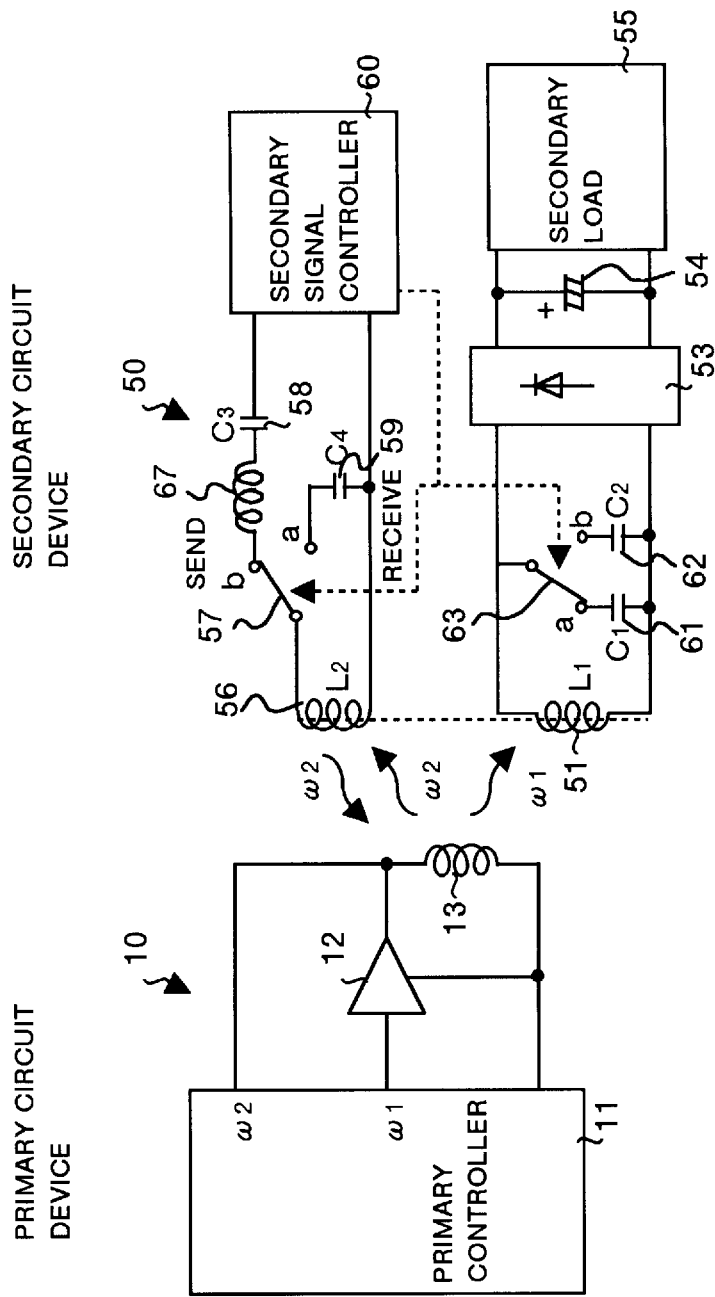
FIG. 4 is a circuit diagram showing Embodiment 4 of the wireless transmit-receive system including therein the secondary circuit device according to the present invention.

FIG. 4 shows Embodiment 4 of the wireless transmit-receive system including therein the secondary circuit device according to the present invention. In this embodiment, a power impedance coil 67 with high impedance is connected in series to the signal circuit (transmitting circuit) of the secondary circuit device 50 at a position between a secondary signal coil 56 and a resonance capacitor 58 for transmitting.

If the condition of an angular frequency $\omega_1$ of a power>>an angular frequency $\omega_2$ of a signal is satisfied, expressions (13) and (14) are derived from the expression (9).

$$\omega_1 \gg \omega_2 = \frac{1}{\sqrt{L_2 C_4}} \quad (13)$$

$$\therefore \omega_1 L_2 \gg \frac{1}{\omega_1 C_4} \quad (14)$$

Herein, C3 is equal to C4, so that the expression (14) can be substituted into the expression (15).

$$\omega_1 L_2 \gg \frac{1}{\omega_1 C_3} \quad (15)$$

Resistance R in FIG. 19 is equivalent resistance excluding resistance in the coil section of the signal circuit, so that the equivalent resistance R in the receiving mode is expressed by the expression (16) as indicated by the expression (14).

In receiving:

$$R = \frac{1}{\omega_1 C_4} \ll \omega_1 L_2 \quad (16)$$

In contrast, the equivalent resistance R in the transmitting mode is one in which impedance of the secondary signal controller 60 is added to $1/\omega_1 C_3$, so that the equivalent resistance R in the transmitting mode is expressed by the expression (17).

In transmitting:

$$R = \frac{1}{\omega_1 C_3} + \text{(impedance of the secondary signal controller 15)} \quad (17)$$

In the equivalent circuit shown in FIG. 19, if a series resistance $R_2$ of the signal induction coil $L_2$ is a very small value so that it is negligible, equivalent resistance $R_0$ in the receiving mode is a value around R=0 from the expression (16). Because the equivalent resistance R obtained by the expression (16) is sufficiently small as compared to $\omega_1 L_2$. The resistance $R_0$ in the receiving mode is expressed by the expression (18).

In receiving $$R_0 = R_1 + \frac{\omega^2 M^2 R_2}{R_2^2 + \omega^2 L_2^2} \approx \frac{M^2}{L_2} R_2 \approx 0 (\because R_2 \approx 0) \quad (18)$$

Also, as shown by the expression (15), $\omega_2 L_2 \gg 1/\omega_1 C_3$, so that, from the expression (17), equivalent resistance $R_0$ in the transmitting mode takes a maximum value, neglecting $1/\omega_1 C_3$, when $\omega_1 L_2$=(impedance of the second signal controller 60), which is expressed by the expression (19).

In transmitting $$R_0 = R_1 + \frac{\omega_1 M^2}{2L_2} \approx \frac{\omega_1 M^2}{2L_2} \quad (19)$$

The equivalent resistance $R_0$ in the transmitting mode becomes a value which can not be neglected, a power for the electric power circuit is consumed for the impedance in the secondary signal controller 60, and a sufficient power therefor can not be obtained.

For this reason, as shown in FIG. 4, by connecting the power impedance coil 67 with high impedance in series to the transmitter, equivalent resistance R in the equivalent circuit shown in FIG. 19 becomes a very large value, and equivalent resistance $R_0$ in the transmitting mode becomes smaller ($R_0$=$R_1$, and $R_1$ is substantially zero), so that a power for the electric power circuit can not be consumed for the impedance of the secondary signal controller 60, and a sufficient power therefor can be supplied.

In the embodiment also, like in the case of Embodiment 1, an angular frequency $\omega_1$ for a power transfer can be set to a higher value, and an ISM band in 13.56 MHz can be used, so that a large power allowable according to the specification can be transmitted.

It should be noted that impedance of the power impedance coil 67 is $\omega_1 L_3$, and is under the condition of an angular frequency $\omega_1$ for a power<<an angular frequency $\omega_2$ for a signal, so that the impedance becomes a very large value, thus using the coil being convenient in this case.

Figure 5:
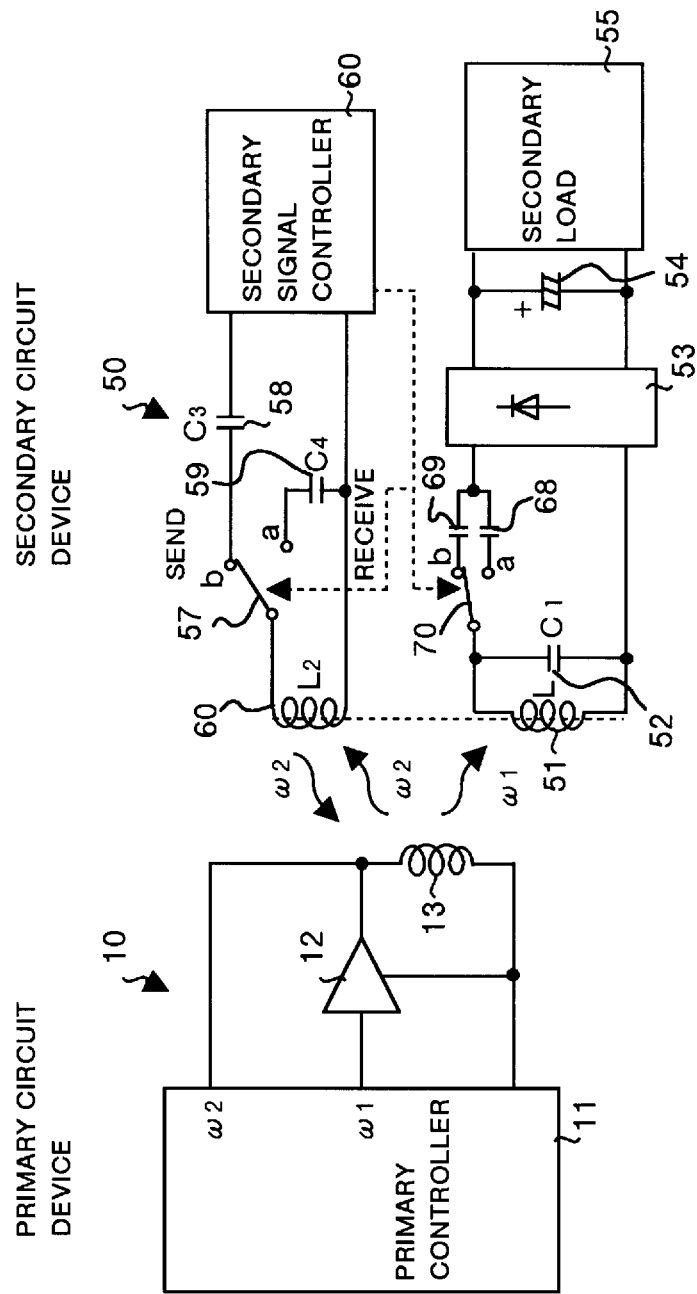
FIG. 5 is a circuit diagram showing Embodiment 5 of the wireless transmit-receive system including therein the secondary circuit device according to the present invention.

FIG. 5 shows Embodiment 5 of the wireless transmit-receive system including therein the secondary circuit device according to the present invention. In this embodiment, two units of impedance matching capacitors 68, 69 are provided, and either one of impedance matching capacitors 68 and 69 can be selected by an impedance matching capacitor select switch 70 for use.

The impedance matching capacitor select switch 70 selects a contact point a for signal receiving in the signal receiving mode, and selects a contact point b for signal transmission in the signal transmitting mode like in a case of the signal transmit-receive select switch 57 according to a control signal outputted from the secondary signal controller 60.

Namely, the impedance matching capacitor select switch 70 selectively closes either one of the impedance matching capacitors 68 and 69 according to the transmitting mode or the receiving mode.

As described above, impedance in resonance of the power parallel resonance circuit varies according to the transmitting mode or the receiving mode for the signal circuit, so that impedance matching with the rectifying circuit 53 can not be achieved.

In the embodiment, the impedance matching capacitors 68 and 69 are switched to each other with the impedance matching capacitor select switch 70 controlled by the secondary signal controller 60, whereby an optimal impedance matching capacitor can be selected regardless of whether an operating state is in the receiving mode or in the transmitting mode, so that correct impedance matching can be obtained, which makes it possible to derive a maximum power from the parallel resonance circuit comprising the power induction coil 51 and resonance capacitor 52 to the rectifying circuit 53.

Figure 6A:
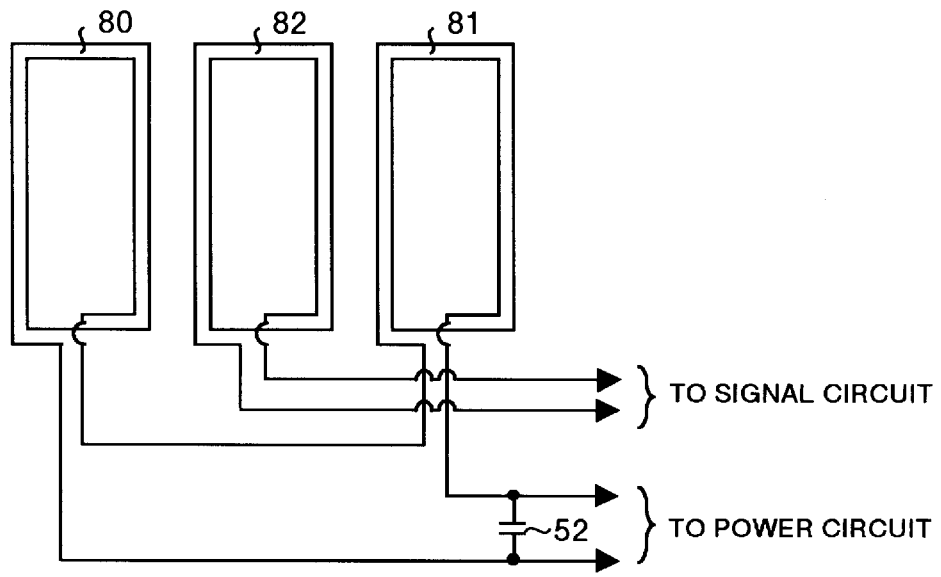
FIG. 6A is a block diagram of a coil section showing Embodiment 6 of the secondary circuit device for a wireless transmit-receive system according to the present invention.
Figure 6B:
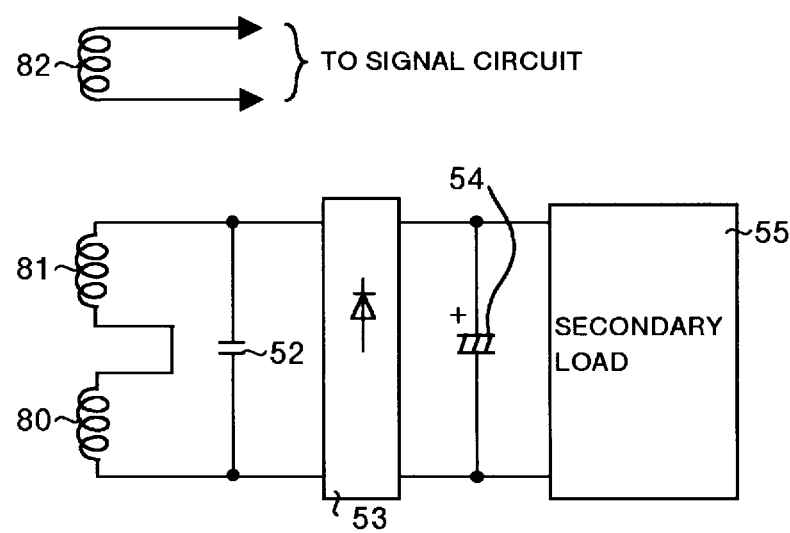
FIG. 6B is a circuit diagram for the same.

FIG. 6A and FIG. 6B each show Embodiment 6 of the secondary circuit device for a wireless transmit-receive system according to the present invention. In the figures, designated at the reference numerals 80 and 81 are power induction coils, and at 82 a signal induction coil.

The power induction coils 80 and 81 are provided in both sides of the signal induction coil 82. The power induction coils 80 and 81 are connected to each other in series, and the parallel resonance capacitor 52 is connected to the series circuit in parallel.

The power induction coils 80 and 81 are provided in both sides of the signal induction coil 82, so that, as shown in FIG. 16, even if the secondary circuit device 50 comes closer to the primary circuit device 10 from any direction, at first the secondary circuit device 50 receives a magnetic flux generated by the primary circuit device with the power induction coil 80 or 81, and a power is received, so that the requirement for a start of power supply is satisfied.

Figure 7A:
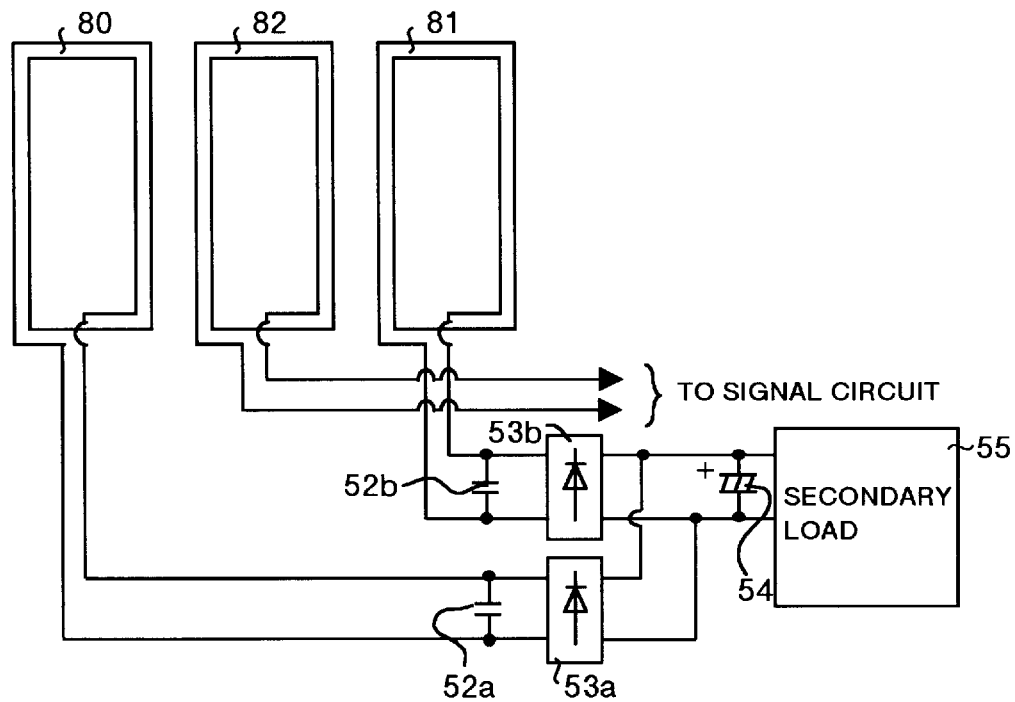
FIG. 7A is a block diagram of a coil section showing Embodiment 7 of the secondary circuit device for a wireless transmit-receive system according to the present invention.
Figure 7B:
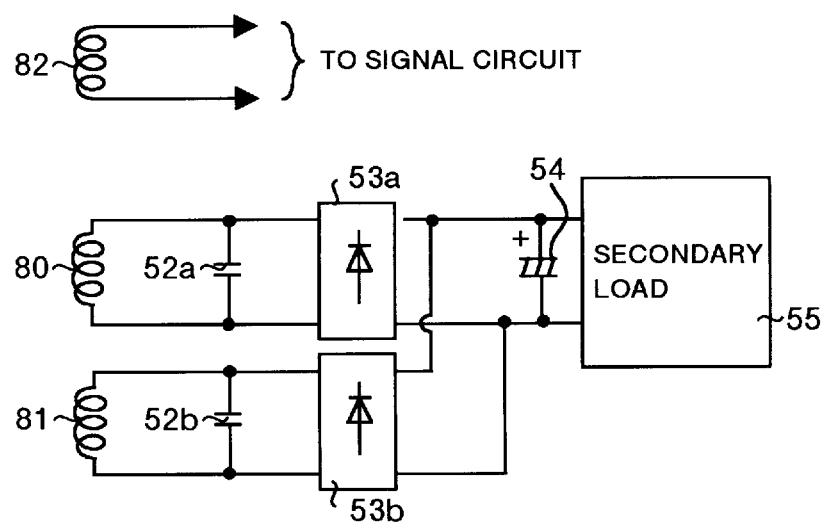
FIG. 7B is a circuit diagram for the same.

FIG. 7A and FIG. 7B each show Embodiment 7 of the secondary circuit device for a wireless transmit-receive system according to the present invention. The power induction coils 80 and 81 are also provided in both sides of the signal induction coil 82 in this embodiment. The power induction coils 80 and 81 are discretely connected to the resonance capacitors 52a, 52b, and the rectifying circuits 53a, 53b respectively, so that two systems each comprising the parallel resonance circuit and rectifying circuit for power induction are provided in both sides of the signal induction coil 82.

In the embodiment, in contrast to Embodiment 6, even if only one of the power induction coils, for instance, the power induction coil 80 receives a magnetic flux from the primary circuit device, the coil can advantageously receive a power with stability.

Figure 8:
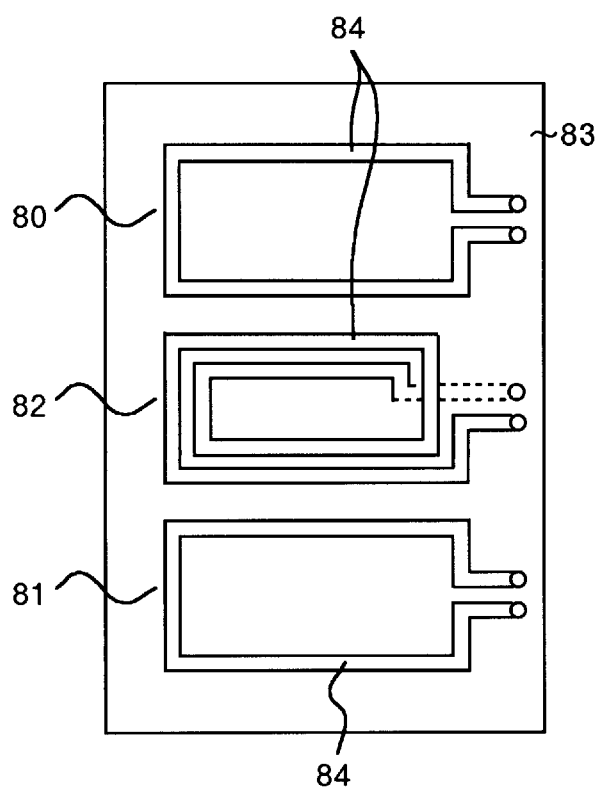
FIG. 8 is a block diagram of a coil section showing Embodiment 8 of the secondary circuit device for a wireless transmit-receive system according to the present invention.

FIG. 8 shows Embodiment 8 of the secondary circuit device for a wireless transmit-receive system according to the present invention. In this embodiment, the circuit device comprises conductor loop patterns 84 which are formed by patterning the power induction coils 80, 81 and signal induction coil 82 on a printed board 83 respectively.

As described above, the circuit device comprises conductor loop patterns 84 which are formed by patterning the power induction coils 80, 81 and signal induction coil 82 on a printed board 83 respectively, which makes it possible to manufacture low-cost coils with less manufacturing processes.

Figure 9A:
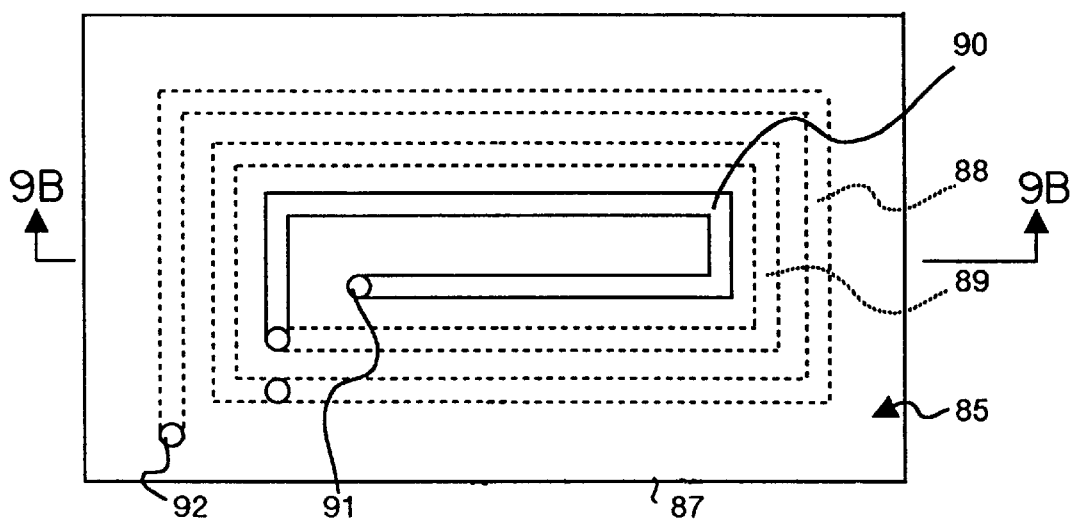
FIG. 9A is a plan view showing Embodiment 9 of the induction coil for the wireless transmit-receive system according to the present invention.
Figure 9B:
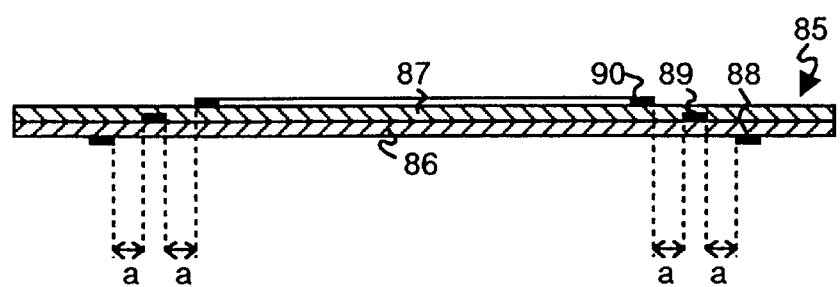
FIG. 9B is a cross-sectional view of the same taken along the line A—A in FIG. 9A.

FIG. 9A and FIG. 9B each show Embodiment 9 of the induction coil for the wireless transmit-receive system according to the present invention. In this embodiment, conductor loop patterns 88, 89, 90 are formed one loop each in three layers in total; namely in both the top and rear layers of a first board 86 and a first surface layer of a second board 87 in a multi-layered printed board 85.

A specified gap a is provided between the adjoining conductor loop patterns 88 and 89, and also 89 and 90 respectively, in other words, a pattern is provided with a specified gap a between adjoining layers when viewed from the top of the patterns, and the conductor loop pattern is continuously formed in a substantially spiral form in the order of 88→89→90, and terminal edges of the conductor loop patterns 88 and 90 are input and output edges 91 and 92 respectively.

Coils can be designed as described above so that a gap between lines can be made wider and the input edge 91 and output edge 92 having the largest voltage difference therebetween can be provided away from each other, which makes it possible to manufacture low-cost coils each having an excellent frequency property and less manufacturing processes.

Figure 10A:
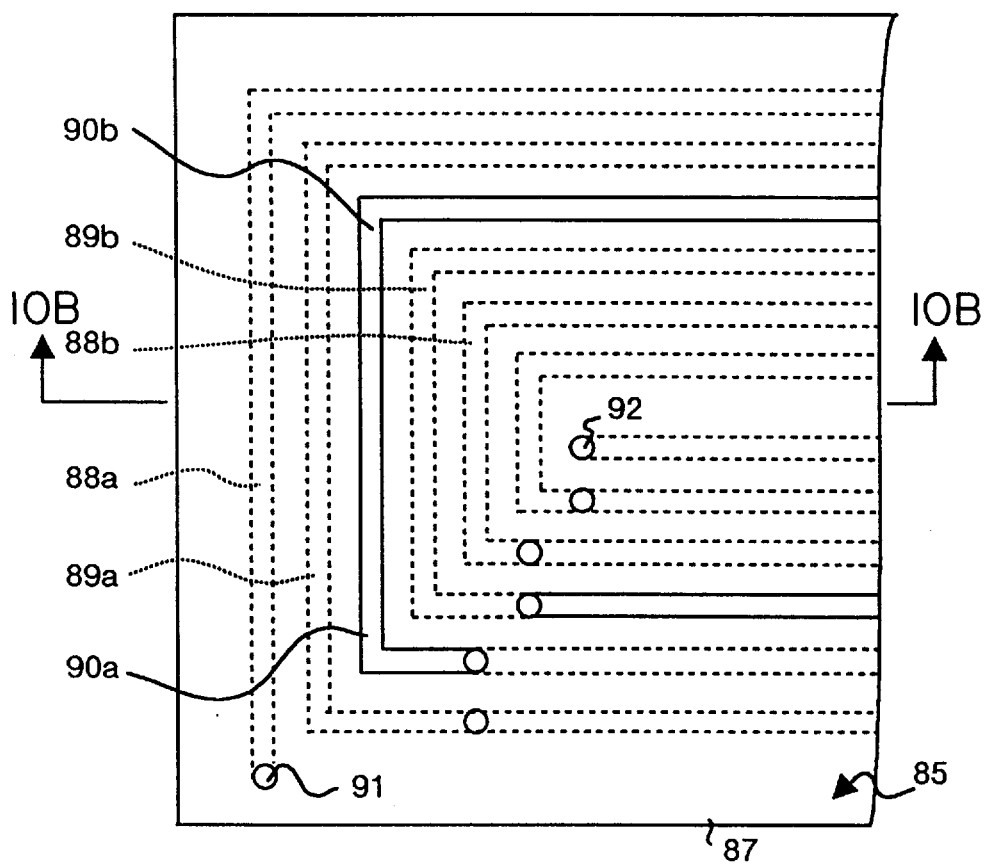
FIG. 10A is a plan view showing Embodiment 10 of the induction coil for the wireless transmit-receive system according to the present invention.
Figure 10B:
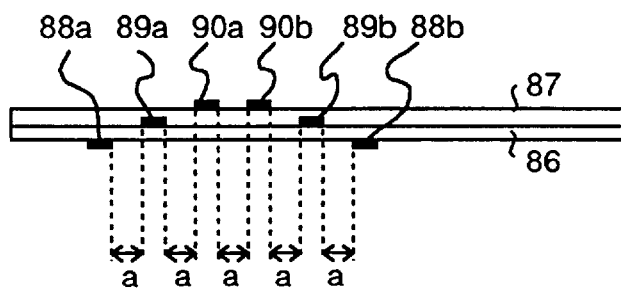
FIG. 10B is a cross-sectional view of the same taken along the line A—A in FIG. 10A.
Figure 11A:
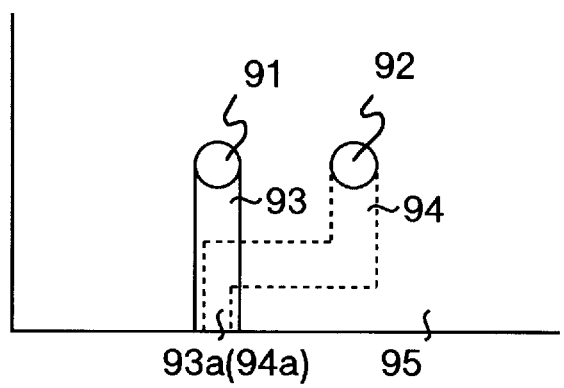
FIG. 11A is a plan view of single substrate itself showing Embodiment 11 of the induction coil for the wireless transmit-receive system according to the present invention.
Figure 11B:
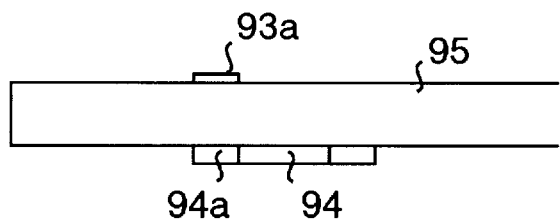
FIG. 11B is a front view of the same.

FIG. 10A and FIG. 10B each show Embodiment 10 of the induction coil for the wireless transmit-receive system according to the present invention.

In this embodiment, conductor loop patterns 88a, 88b are formed in the rear surface layer of the first board 86 in the multi-layered printed board 85, conductor loop patterns 89a, 89b in the surface layer of the first board 86 therein, and conductor loop patterns 90a, 90b in the surface layer of the second board 87 therein respectively. A specified gap a is provided between the adjoining conductor loop patterns 88a and 88b, 89a and 90a, 90b and 89b, and 89b and 88b respectively, the conductor loop pattern is continuously formed in a substantially spiral form in the order of 88a→89a→90a→90b→89b→88b, and terminal edges of the conductor loop patterns 88a and 88b are input/output edges 91 and 92 respectively.

For this reason, the coil in this case starts from the rear surface layer (the first layer) of the first board 86 with the conductor loop pattern 88a, then links to the conductor loop pattern 89a on the surface layer of the first board 86, the conductor loop patterns 90a, 90b on the surface layer (n-layer) of the second board 87, and returns from the conductor loop pattern 90b on the surface layer (n-layer) of the second board 87 to the conductor loop pattern 89b on the surface layer of the first board 86 and the conductor loop pattern 88b on the rear surface layer (the first layer) of the first board 86, namely, the loop goes, thus extending reciprocally between the first layer board 86 and second board 87 in the multi-layered printed board 85.

Coils can be designed as described above so that a gap between lines can be made wider and the input edge 91 and output edge 92 having the largest voltage difference therebetween can be provided away from each other like that in the case of Embodiment 6, and also the loop goes and returns between the first layer board 86 and second board 87 in the multi-layered printed board 85, so that a number of patterns can be increased. Accordingly low-cost coils each having an excellent frequency property and large inductance can be manufactured with less manufacturing steps.

FIG. 11A, 11B and FIGS. 12A, 12B each show Embodiment 11 of the induction coil for the wireless transmit-receive system according to the present invention. In this embodiment, lead patterns 93, 94 are formed in a starting edge of a coil, namely an input terminal 91 in a printed board 95 on which conductor loop patterns (not shown herein) are formed like those in Embodiments 9, 10 as well as in a terminating edge thereof, namely an output terminal 92 respectively. The lead patterns 93, 94 have connection terminals 93a, 94a, respectively positioned at the same position in the top and rear surface of the printed board 95 viewed from the top of the pattern.

Figure 12A:
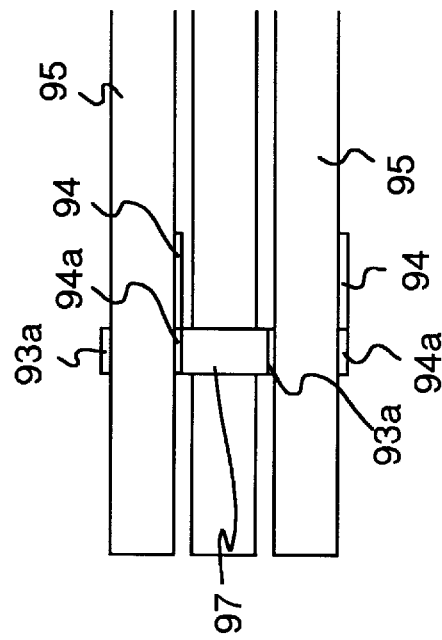
FIG. 12A is a front view showing Embodiment 11 of the induction coil for the wireless transmit-receive system according to the present invention in a state of combination of substrates.
Figure 12B:
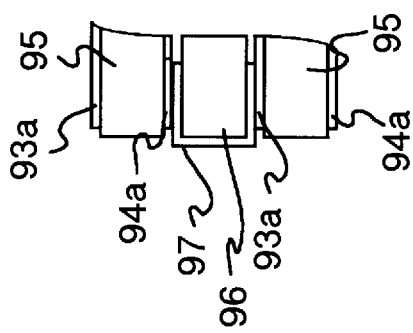
FIG. 12B is a side view of the same.
Figure 13:
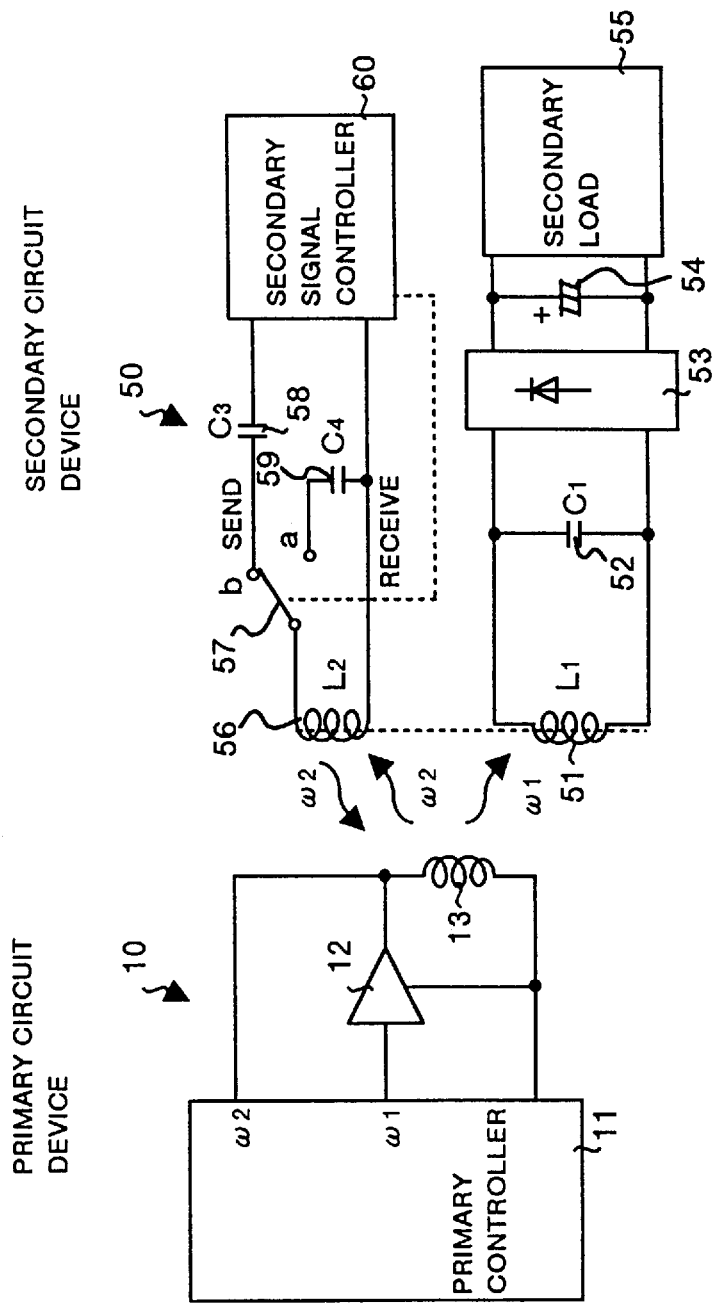
FIG. 13 is a circuit diagram showing the wireless transmit-receive system including therein the secondary circuit device based on the conventional technology.
Figure 14:
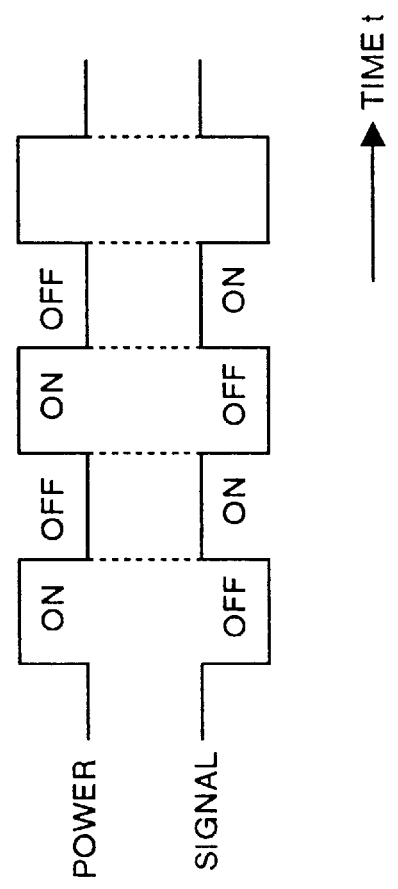
FIG. 14 is a timing chart showing an operating timing in a time division control system.
Figure 15:
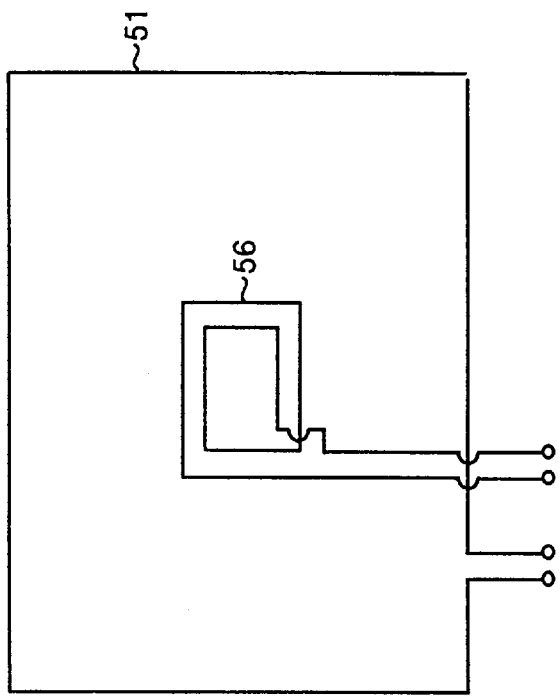
FIG. 15 is a plan view showing a coil section of the secondary circuit device based on the conventional technology.
Figure 17A:
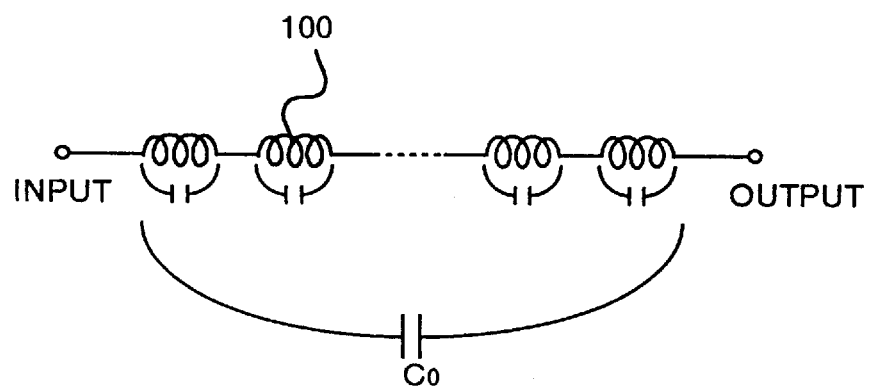
FIG. 17A is a concept view of coils wound with a electric wire.
Figure 17B:
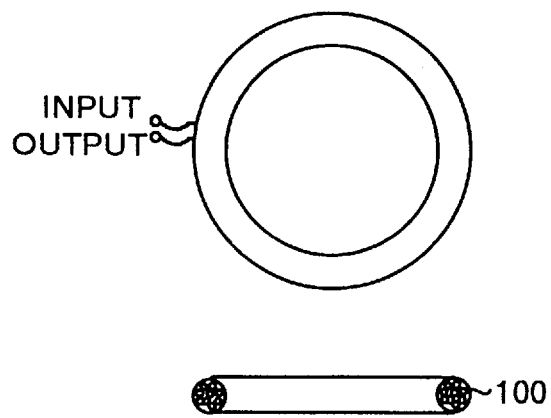
FIG. 17B is an outline drawing for the same.
Figure 18A:
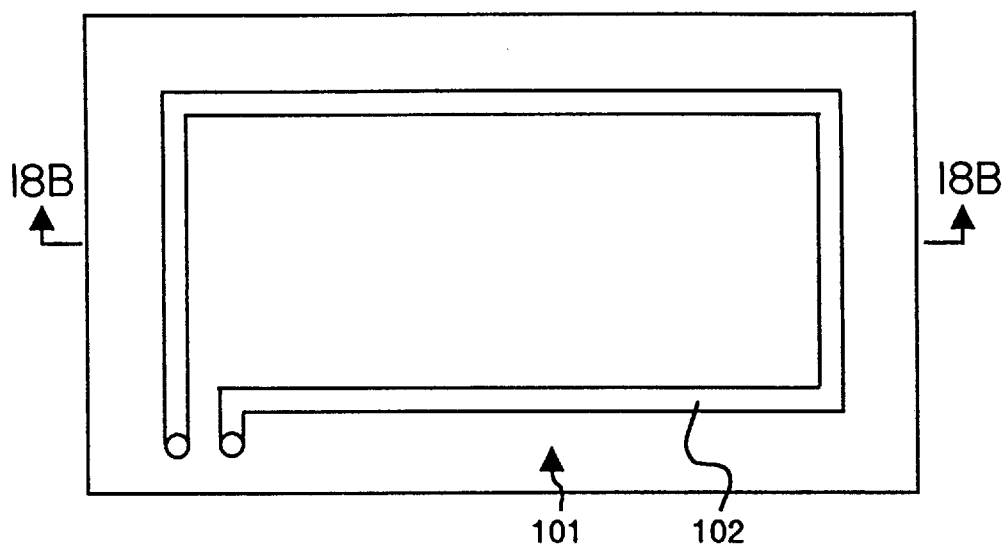
FIG. 18A is a plan view of the printed board coil based on the conventional technology.
Figure 18B:
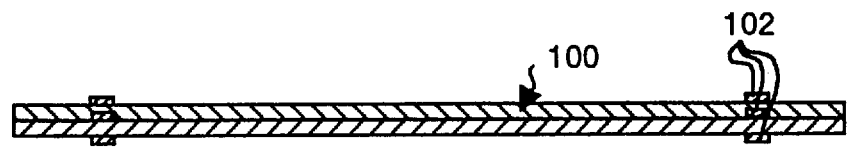
FIG. 18B is a cross-sectional view of the same taken along the line A—A in FIG. 18A.

A plurality of sheets of the printed board 95 each made with the same specifications are, as shown in FIGS. 12A and 12B overlaid with each other with an insulating plate 96 therebetween for use. The output terminal 92 of one (upper side) of the printed boards 95 vertically adjoining with the insulating plate 96 therebetween is electrically connected to the output terminal 91 of the other side (lower side) thereof with a ⊐-shape connection fitting 97 engaged and attached to the insulating plate 96 by covering the top and bottom of the plate.

In the embodiment, by increasing a number of sheets of printed board 95, a number of patterns of the coil can be increased, so that a board having an excellent frequency property, large inductance, and also being manufactured with low costs, for instance a two-layered board can be used, which makes it possible to manufacture low-cost coils.

It should be noted that the coils described in Embodiments 9 to 11 may be formed as the same type of coil as that in Embodiment 8.

As clearly understood from the description above, in the secondary circuit device for a wireless transmit-receive system according to the present invention, the resonance capacitor select switch selectively closes either one of the first power resonance capacitor and the second power resonance capacitor according to the transmitting mode or receiving mode, so that variation of the impedance viewed from the power circuit according to the transmit-receive mode in the signal circuit can be compensated with a capacitor capacity, and an efficiency in power energy transfer can be improved.

In the secondary circuit device for a wireless transmit-receive system according to another feature of the present invention, a capacity of a variable capacity capacitor varies by the control means according to the transmitting mode or the receiving mode, so that variation of the impedance viewed from the power circuit according to the transmit-receive mode for the signal circuit is compensated with a capacitor capacity, and an efficiency in power energy transfer can be improved.

In the secondary circuit device for a wireless transmit-receive system according to another feature of the present invention, an inductance select switch selectively closes either one of an edge section or an intermediate tap of a power induction coil with a tap according to the transmitting mode or receiving mode, so that variation of the impedance viewed from the power circuit according to the transmit-receive mode for the signal circuit is compensated with inductance of the power induction coil with a tap, and an efficiency in power energy transfer can be improved.

In the secondary circuit device for a wireless transmit-receive system according to another feature of the present invention, a high impedance element makes equivalent resistance in the transmitting mode smaller, so that a power for the power circuit is not consumed by the impedance in a secondary signal controller, and a voltage for the power circuit can be supplied, which makes it possible to obtain a circuit having an excellent efficiency in energy transfer.

In the secondary circuit device for a wireless transmit-receive system according to another feature of the present invention, a high impedance element can effectively realized with a power impedance coil.

In the secondary circuit device for a wireless transmit-receive system according to another feature of the present invention, the impedance matching select switch selectively closes either one of the first impedance matching capacitor and the second impedance matching capacitor according to the transmitting mode or receiving mode, so that, even if a coil value in the power circuit varies and a parallel resonance impedance during resonance varies according to the transmit-receive mode for the signal circuit, impedance can be matched with a rectifying circuit. For this feature, it is possible to derive a maximum power from the parallel resonance circuit to the rectifying circuit.

In the secondary circuit device for a wireless transmit-receive system according to another feature of the present invention, power induction coils are provided in both sides of the signal induction coil respectively, so that a condition in which an electric power is required to start up first in the secondary circuit device is satisfied.

In the secondary circuit device for a wireless transmit-receive system according to another feature of the present invention, power induction coils are provided in both sides of the signal induction coil respectively, so that a condition in which an electric power is required to start up first in the secondary circuit device is satisfied, and in addition, each of the two power induction coils constitutes a parallel resonance circuit respectively, and a rectifying circuit is connected to each of the coils respectively, so that even if only one of the power induction coil is operated, the imbalance does not occur therein.

In the secondary circuit device for a wireless transmit-receive system according to another feature of the present invention, a signal induction coil and a power induction coil comprise conductor loop patterns each formed on a printed board respectively, so that low-cost coils can be manufactured.

In the induction coil for a wireless transmit-receive system according to another feature of the present invention, one induction coil is formed by electrically connecting the conductor loop patterns on adjoining layers from the first layer up to the n-th layer, and a conductor loop pattern formed in each of the layers of a multi-layered printed board is displaced by a specified gap from that formed on the adjoining layer, so that coils can be designed so that a gap between lines can be made wider and the input terminal and output terminal having the largest voltage difference therebetween can be provided away from each other, which makes it possible to manufacture low-cost coils each having an excellent frequency property and less manufacturing processes.

In the induction coil for a wireless transmit-receive system according to another feature of the present invention, one induction coil is formed by electrically connecting the conductor loop patterns on adjoining layers from the first layer up to the n-th layer, and by electrically connecting the conductor loop patterns on adjoining layers from the n-th layer up to the first layer, and a conductor loop pattern formed in each of the layers of a multi-layered printed board is displaced by a specified gap from that formed on the adjoining layer, so that coils can be designed so that a gap between lines can be made wider and the input terminal and output terminal having the largest voltage difference therebetween can be provided away from each other, and also a number of patterns can be increased, which makes it possible to manufacture low-cost coils each having an excellent frequency property, large inductance and less manufacturing processes.

In the induction coil for a wireless transmit-receive system according to another feature of the present invention, the printed boards are overlaid with an insulating plate therebetween, and a terminating edge of a conductor loop pattern on one printed board is electrically connected, with a connecting fitting engaged and attached to the insulating plate, to a starting edge of a conductor loop pattern formed on another printed board adjoining the former layer with the insulating plate therebetween, and one induction coil can be formed, so that a number of patterns can be increased without any specific condition by increasing a number of sheets of printed board, and for this reason, a low-cost board having an excellent frequency property, large inductance, for instance, a two-layered board can be used, which makes it possible to manufacture low-cost coils.

This application is based on Japanese patent application No. HEI 8-140495 filed in the Japanese Patent Office on Jun. 3, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A secondary circuit device for a wireless transmit-receive system having a transmitting mode and a receiving mode, to which electric power and a signal are transmitted from a primary circuit device through mutual induction in a non-contact form comprising:

a power induction coil;

a first power resonance capacitor and a second power resonance capacitor each connected in parallel to said power induction coil;

a signal induction coil connected to said power induction coil through mutual inductance;

a resonance capacitor for transmitting connected in series to said signal induction coil;

a resonance capacitor for receiving connected in parallel to said signal induction coil;

a signal transmit-receive select switch which selectively elects either one of said resonance capacitor for transmitting and said resonance capacitor for receiving according to the transmitting mode or the receiving mode of the transmit-receive system; and a resonance capacitor select switch which selectively elects either one of said first power resonance capacitor and said second power resonance capacitor according to the transmitting mode or the receiving mode of the transmit-receive system.

2. A secondary circuit device for a wireless transmit-receive system, to which an electric power and a signal are transmitted from a primary circuit device through mutual induction in a non-contact form comprising:

a power induction coil;

a variable capacity capacitor connected in parallel to said power induction coil;

a signal induction coil connected to said power induction coil through mutual inductance;

a resonance capacitor for transmitting connected in series to said signal induction coil;

a resonance capacitor for receiving connected in parallel to said signal induction coil;

a signal transmit-receive select switch which selectively closes either one of said resonance capacitor for transmitting and said resonance capacitor for receiving according to the transmitting mode or receiving mode; and a control means for changing capacity of said variable capacity capacitor according to the transmitting mode or receiving mode.

3. A secondary circuit device for a wireless transmit-receive system having a transmitting mode and a receiving mode, to which electric power and a signal are transmitted from a primary circuit device through mutual induction in a non-contact form comprising:

a power induction coil with a tap having an intermediate tap;

a power resonance capacitor connected in parallel to said power induction coil with a tap;

a signal induction coil connected to said power induction coil through mutual inductance;

a resonance capacitor for transmitting connected in series to said signal induction coil;

a resonance capacitor for receiving connected in parallels to said signal induction coil;

a signal transmit-receive select switch which selectively elects either one of said resonance capacitor for transmitting and said resonance capacitor for receiving according to the transmitting mode or the receiving mode of the transmit-receive system; and an inductance select switch which selectively elects either one of an edge section or an intermediate tap of said power induction coil with a tap according to the transmitting mode or the receiving mode of the transmit-receive system.

4. A secondary circuit device for a wireless transmit-receive system having a transmitting mode and a receiving mode, to which electric power and a signal are transmitted from a primary circuit device through mutual induction in a non-contact form comprising:

a power induction coil;

a power resonance capacitor connected in parallel to said power induction coil;

a signal induction coil connected to said power induction coil through mutual inductance;

a resonance capacitor for transmitting connected in series to said signal induction coil;

a resonance capacitor for receiving connected in parallel to said signal induction coil;

a signal transmit-receive select switch which selectively elects either one of said resonance capacitor for transmitting and said resonance capacitor for receiving according to the transmitting mode and the receiving mode of the transmit-receive system; and a high impedance element connected in series between said signal induction coil and said resonance capacitor for transmitting.

5. A secondary circuit device for a wireless transmit-receive system according to claim 4; wherein said high impedance element comprises a power impedance coil.

6. A secondary circuit device for a wireless transmit-receive system having a transmitting mode and a receiving mode, to which electric power and a signal are transmitted from a primary circuit device through mutual induction in a non-contact form comprising:

a power induction coil;

a power resonance capacitor connected in parallel to said power induction coil;

a signal induction coil connected to said power induction coil through mutual inductance;

a resonance capacitor for transmitting connected in series to said signal induction coil;

a resonance capacitor for receiving connected in parallel to said signal induction coil;

a signal transmit-receive a select switch which selectively elects either one of said resonance capacitor for transmitting and said resonance capacitor for receiving according to the transmitting mode or the receiving mode of the transmit-receive system;

a rectifying circuit connected to an output of a parallel resonance circuit for power induction comprising said power induction coil and said power resonance capacitor;

a first impedance matching capacitor and a second impedance matching capacitor each connected in series between said power induction coil and said rectifying circuit; and an impedance matching capacitor select switch which selectively elects either one of said first impedance matching capacitor and said second impedance matching capacitor according to the transmitting mode or the receiving mode of the transmit-receive system.

7. A secondary circuit device for a wireless transmit-receive system, to which an electric power and a signal are transmitted from a primary circuit device through mutual induction in a non-contact form; wherein power induction coils are provided in both sides of a signal induction coil respectively and a power resonance capacitor is connected in parallel to a circuit formed by connecting the two power induction coils in series.

8. A secondary circuit device for a wireless transmit-receive system according to claim 7; wherein said signal induction coil and said power induction coil comprise a conductor loop pattern formed on a printed board respectively.

9. A secondary circuit device for a wireless transmit-receive system, to which an electric power and a signal are transmitted from a primary circuit device through mutual induction in a non-contact form; wherein power induction coils are provided on both sides of a signal induction coil and a power resonance capacitor and a rectifying circuit are connected in parallel to each of the two power induction coils.

10. A secondary circuit device for a wireless transmit-receive system according to claim 9; wherein said signal induction coil and said power induction coil comprise a conductor loop pattern formed on a printed board respectively.

11. An induction coil for a wireless transmit-receive system in which electric power and a signal are transmitted from a primary circuit device to a secondary circuit device through mutual inductance in a non-contact form; wherein a conductor loop pattern is formed in each of n adjoining layers of a multi-layered printed board, each of said conductor loop patterns in each of said n adjoining layers being displaced by a specific gap from the conductor loop pattern formed on an adjacent adjoining layer, and one induction coil is formed by electrically connecting the conductor loop patterns on the n adjoining layers from the first layer up to the n-th layer.

12. An induction coil for a wireless transmit-receive system in which an electric power and a signal are transmitted from a primary circuit device to a secondary circuit device through mutual inductance in a non-contact form; wherein a conductor loop pattern is formed by two loops in each of n adjoining layers of a multi-layered printed board, each of said conductor loop patterns in each of said n adjoining layers being displaced by a specific gap from the conductor loop pattern formed on an adjacent adjoining layer, and the conductor loop patterns formed on adjacent adjoining layers are electrically connected to each other from the first layer up to the n-th layer and from the n-th layer up to the first layer to form an induction coil.

13. An induction coil for a wireless transmit-receive system in which an electric power and a signal are transmitted from a primary circuit device to a secondary circuit device through mutual inductance in a non-contact form having a plurality sheets of printed boards, in each of which a conductor loop pattern is formed by patterning and a starting edge of the conductor loop pattern and a terminating edge thereof are formed at the same position of the top and rear surfaces of the board; wherein the printed boards are overlaid with an insulating plate therebetween, and a terminating edge of a conductor loop pattern on one printed board is electrically connected, with a connection fitting engaged and attached to the insulating plate, to a starting edge of a conductor loop pattern formed on another printed board adjoining the former layer with said insulating plate therebetween.

* * * * *